United States Patent
Kobilarov et al.

(10) Patent No.: US 12,275,431 B1
(45) Date of Patent: Apr. 15, 2025

(54) IDENTIFYING RELEVANT OBJECTS WITHIN AN ENVIRONMENT

(71) Applicant: Zoox, Inc., Foster City, CA (US)

(72) Inventors: Marin Kobilarov, Baltimore, MD (US); Linjun Zhang, Canton, MI (US)

(73) Assignee: Zoox, Inc., Foster City, CA (US)

( * ) Notice: Subject to any disclaimer, the term of this patent is extended or adjusted under 35 U.S.C. 154(b) by 205 days.

(21) Appl. No.: 17/854,269

(22) Filed: Jun. 30, 2022

(51) Int. Cl.
*B60W 60/00* (2020.01)
*B60W 30/09* (2012.01)
(Continued)

(52) U.S. Cl.
CPC ........ *B60W 60/0011* (2020.02); *B60W 30/09* (2013.01); *B60W 30/0956* (2013.01); *B60W 30/18159* (2020.02); *B60W 40/04* (2013.01); *B60W 40/105* (2013.01); *B60W 50/0097* (2013.01); *B60W 60/0015* (2020.02);
(Continued)

(58) Field of Classification Search
CPC ........ G08G 1/161; G08G 1/163; G08G 1/166; G08G 3/02; G08G 5/04; G08G 5/045; B60W 30/09; B60W 30/095; B60W 30/0953; B60W 60/0011; B60W 60/0015–0017; B60W 60/0027–00276;
(Continued)

(56) References Cited

U.S. PATENT DOCUMENTS 10,832,439 B1 * 11/2020 Ma .................. G05D 1/0246
11,370,423 B2 * 6/2022 Casas ................ G06V 10/82
(Continued)

FOREIGN PATENT DOCUMENTS

DE 102010044631 A1 * 3/2012 ........ B60W 30/0953
DE 102018203583 A1 * 9/2019
(Continued)

OTHER PUBLICATIONS

Sebastian, Alvin et al., "Multi-vehicles interaction graph model for cooperative collision warning system", 2009 IEEE Intelligent Vehicles Symposium, Date of Conference: Jun. 3-5, 2009, pp. 929 to 934. (Year: 2009).*
(Continued)

*Primary Examiner* — David A Testardi
(74) *Attorney, Agent, or Firm* — Lee & Hayes, P.C.

(57) ABSTRACT

Techniques for determining relevant objects in an environment around a vehicle are discussed herein. Sensor data can be captured and input to a model to determine predicted object trajectories and associated probabilities. For a candidate trajectory for the vehicle to follow, regions of overlap between the vehicle trajectory and the predicted object trajectories can be determined. An interaction graph can be generated representing interactions between the candidate trajectory and the predicted object trajectories. The interaction graph can be sampled based on the probabilities and/or other characteristics. Samples from the interaction graph can be used to determine relevant objects in a driving scenario for a vehicle traversing an environment. Based on the sample, the vehicle may generate a relevancy score associated with the sample. The vehicle may determine that a number of the most relevant sample scenarios may be sent to a prediction component and control of the vehicle.

10 Claims, 7 Drawing Sheets

(51) Int. Cl.
*B60W 30/095* (2012.01)
*B60W 30/18* (2012.01)
*B60W 40/04* (2006.01)
*B60W 40/105* (2012.01)
*B60W 50/00* (2006.01)

(52) U.S. Cl.
CPC . *B60W 60/00274* (2020.02); *B60W 2520/105* (2013.01); *B60W 2554/4044* (2020.02); *B60W 2554/4045* (2020.02)

(58) Field of Classification Search
CPC .. G05D 1/0088; G05D 1/0214; G05D 1/0289; G05D 1/633; G05D 1/637; G05D 1/43
See application file for complete search history.

(56) References Cited

U.S. PATENT DOCUMENTS

| | | | |
|---|---|---|---|
| 11,392,128 B1* | 7/2022 | Ma | G05D 1/0212 |
| 11,429,105 B2 | 8/2022 | Sorin et al. | |
| 11,975,726 B1* | 5/2024 | Gu | G06N 3/044 |
| 12,110,042 B1* | 10/2024 | Hoang | G06N 3/045 |
| 12,128,895 B2 | 10/2024 | Seong et al. | |
| 2006/0282218 A1* | 12/2006 | Urai | B60W 30/095 |
| | | | 340/436 |
| 2008/0309468 A1 | 12/2008 | Greene et al. | |
| 2010/0042323 A1* | 2/2010 | Harada | B60W 30/08 |
| | | | 701/300 |
| 2011/0246156 A1* | 10/2011 | Zecha | G06V 40/23 |
| | | | 703/6 |
| 2013/0179047 A1* | 7/2013 | Miller | B60W 30/09 |
| | | | 701/70 |
| 2015/0375743 A1* | 12/2015 | Izuhara | B60W 30/18145 |
| | | | 701/36 |
| 2016/0368492 A1* | 12/2016 | Al-Stouhi | B60W 30/09 |
| 2017/0113665 A1* | 4/2017 | Mudalige | G08G 1/163 |
| 2017/0113683 A1* | 4/2017 | Mudalige | B60W 30/0956 |
| 2018/0114442 A1* | 4/2018 | Minemura | B60R 21/013 |
| 2018/0370528 A1 | 12/2018 | Rittger et al. | |
| 2019/0001973 A1* | 1/2019 | Matsunaga | B60W 30/095 |
| 2019/0084560 A1 | 3/2019 | Lee | |
| 2019/0152490 A1* | 5/2019 | Lan | G06V 20/58 |
| 2019/0263344 A1* | 8/2019 | Yokoi | B60W 30/095 |
| 2020/0086854 A1* | 3/2020 | Liu | B60W 30/0956 |
| 2020/0086855 A1* | 3/2020 | Packer | G08G 1/166 |
| 2020/0103523 A1* | 4/2020 | Liu | G01S 13/87 |
| 2020/0110416 A1* | 4/2020 | Hong | G05D 1/0221 |
| 2020/0149906 A1* | 5/2020 | Tu | G06V 20/58 |
| 2020/0189573 A1 | 6/2020 | King et al. | |
| 2020/0231149 A1* | 7/2020 | Eggert | G08G 1/166 |
| 2020/0278681 A1* | 9/2020 | Gier | G06V 20/56 |
| 2020/0361488 A1* | 11/2020 | Miura | B60W 30/18159 |
| 2020/0377085 A1 | 12/2020 | Floyd-Jones et al. | |
| 2021/0053561 A1* | 2/2021 | Beller | B60W 30/18154 |
| 2021/0055733 A1* | 2/2021 | Beller | B60W 30/18154 |
| 2021/0064890 A1* | 3/2021 | Murveit | G01S 7/417 |
| 2021/0122373 A1* | 4/2021 | Dax | B60W 60/0011 |
| 2021/0122380 A1 | 4/2021 | Lan et al. | |
| 2021/0229656 A1* | 7/2021 | Dax | G08G 1/166 |
| 2021/0232913 A1* | 7/2021 | Martin | G06N 3/088 |
| 2021/0276595 A1* | 9/2021 | Casas | G06V 30/19173 |
| 2021/0287531 A1* | 9/2021 | Li | G08G 1/0129 |
| 2021/0370921 A1* | 12/2021 | Silva | B60W 30/0956 |
| 2021/0370990 A1* | 12/2021 | Wulfe | G05D 1/0214 |
| 2022/0017122 A1* | 1/2022 | Malla | G06N 3/049 |
| 2022/0048503 A1* | 2/2022 | Khandelwal | B60W 30/0956 |
| 2022/0153307 A1* | 5/2022 | Choi | G06V 10/82 |
| 2022/0153314 A1* | 5/2022 | Suo | G06V 20/584 |
| 2022/0153315 A1* | 5/2022 | Zeng | G06N 3/045 |
| 2022/0169244 A1* | 6/2022 | Sun | B60W 60/00276 |
| 2022/0292867 A1* | 9/2022 | Zhang | G06T 7/73 |
| 2022/0355825 A1* | 11/2022 | Deo | G06N 3/084 |
| 2022/0388822 A1* | 12/2022 | Weiss | G05D 1/0289 |
| 2023/0030474 A1* | 2/2023 | Nayhouse | B60W 30/18163 |
| 2023/0037142 A1* | 2/2023 | Nayhouse | G05D 1/628 |
| 2023/0182782 A1 | 6/2023 | Zhang | |
| 2023/0192078 A1* | 6/2023 | Nie | B60W 60/00274 |
| | | | 701/301 |
| 2023/0211660 A1* | 7/2023 | Wang | G08G 1/164 |
| 2023/0227030 A1* | 7/2023 | Izumi | B60W 30/18159 |
| | | | 701/45 |
| 2023/0342635 A1* | 10/2023 | Puphal | G05D 1/0214 |
| 2024/0176989 A1* | 5/2024 | Lyu | G06N 3/045 |

FOREIGN PATENT DOCUMENTS

| | | |
|---|---|---|
| KR | 101590787 B1 | 2/2016 |
| KR | 20190004708 A | 1/2019 |
| KR | 102337011 B1 | 12/2021 |
| WO | WO-2022125568 A1 * 6/2022 | ............ B60W 30/09 |

OTHER PUBLICATIONS

Mukherjee, Saptarshi et al., "Predicting Vehicle Behavior Using Automotive Radar and Recurrent Neural Networks", IEEE Open Journal of Intelligent Transportation Systems, Date of Publication: Aug. 20, 2021, pp. 254 to 268. (Year: 2021).*

Office Action for U.S. Appl. No. 17/550,996, mailed on Aug. 4, 2023, Zhang, "Identifying Relevant Objects Within an Environment", 25 pages.

Copy of the PCT Search Report and Written Opinion mailed Mar. 22, 2023 for PCT application No. PCT/US2022/079803, 13 pages.

Office Action for U.S. Appl. No. 18/068,699, dated Feb. 6, 2025, 29 pages.

The Wayback Machine, "Advantages and Disadvantages of Array in C", retrieved from <<https://web.archive.org/web/20210303182616/>> on Jan. 30, 2025, 13 pages.

* cited by examiner

IDENTIFYING RELEVANT OBJECTS WITHIN AN ENVIRONMENT

BACKGROUND

Perception systems and prediction systems utilize sensor data from sensors of a vehicle in order to determine information about objects within an environment, such as the locations, predicted trajectories, and predicted velocities of the objects. This information is then used by planning systems to determine actions for the vehicle to perform while operating in the environment. For instance, the planning systems may determine actions in order to avoid the objects, such as by yielding to the objects, changing lanes to avoid the objects, and/or the like. However, based on the number of objects within the environment, the planning systems may require a large amount of computing resources (e.g., memory, processing power, etc.) and/or an increased processing time to determine the actions.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
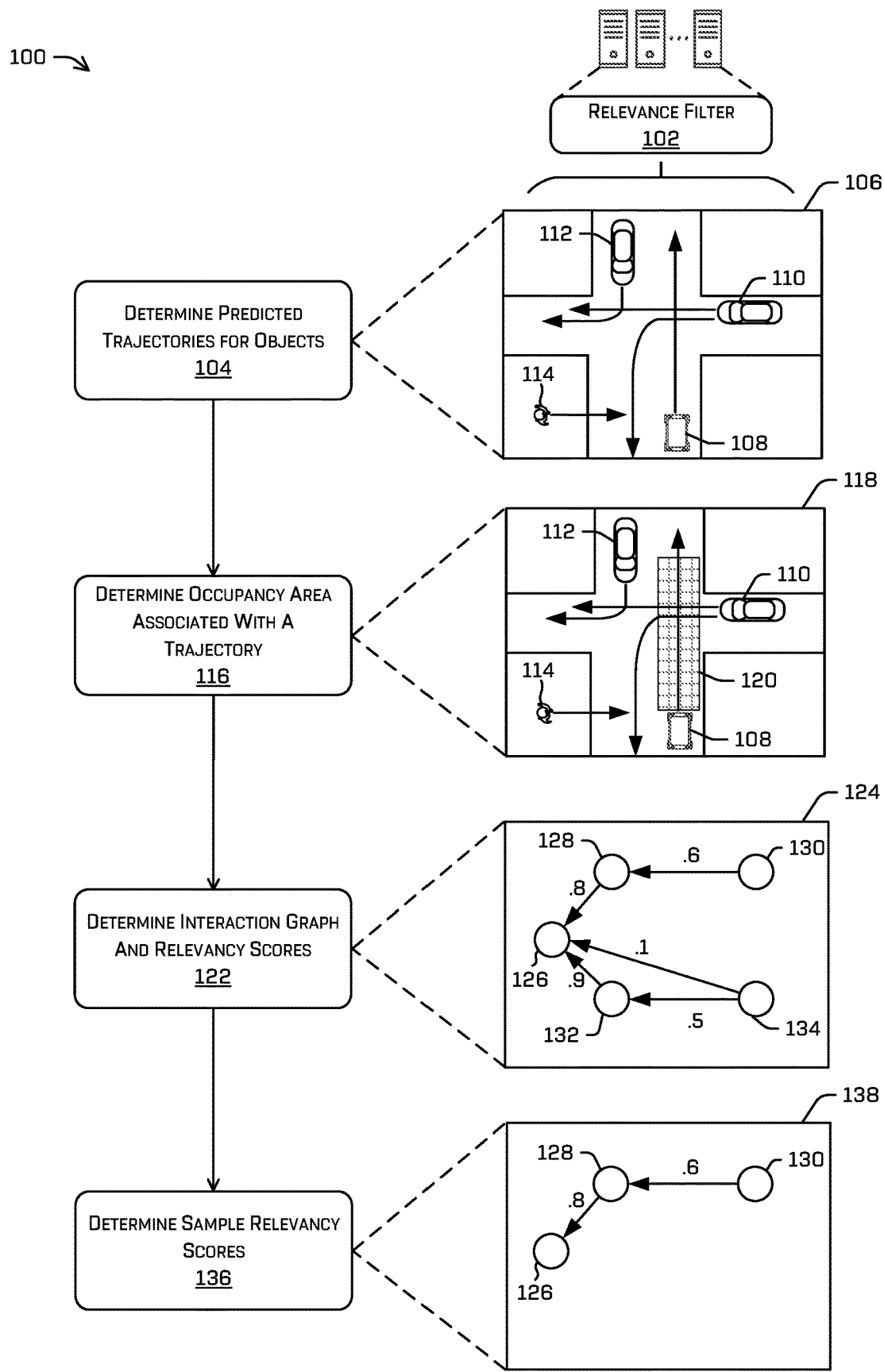
FIG. 1 is a pictorial flow diagram illustrating an example for determining predicted trajectories for objects, determining an occupancy area associated with a vehicle trajectory, determining an interaction graph and relevancy scores, and determining sample relevancy scores.

Techniques for determining relevant objects based on driving scenarios are discussed herein. As described herein, interaction graphs may be generated and used to determine sample driving scenarios that may be relevant for an autonomous vehicle traversing within an environment. In some examples, a vehicle may receive a candidate trajectory to follow through an environment. The vehicle may also identify one or more objects within the environment and determine a number of predicted trajectories associated with individual objects. In some examples, the vehicle may determine an occupancy area associated with the candidate trajectory (e.g., an area in which the vehicle may occupy based on following the candidate trajectory), based on the vehicle's dynamics. Based on determining that the predicted trajectories enter the occupancy area, the vehicle can generate an interaction graph representing the interaction between the candidate trajectory and the predicted trajectories. In some examples, the vehicle may determine a sample driving scenario from the interaction graph by sampling a single trajectory for each object (or any other subset). Based on the sample, the vehicle may generate a relevancy score associated with the sample. The vehicle may determine that a number of the most relevant sample scenarios may be sent to a prediction component. As discussed throughout this disclosure, the techniques may improve vehicle safety and driving efficiency by ensuring that the most relevant objects and driving scenarios are being evaluated by the vehicle, thereby generating more efficient and accurate trajectories.

When an autonomous vehicle is operating within a driving environment, the vehicle may receive sensor data (e.g., captured by sensors of the vehicle or received from remote sensors) of the surrounding environment. The sensor data, which may include image data, radar data, lidar data, etc., may be analyzed by the autonomous vehicle to detect and classify various objects within the operating environment. An autonomous vehicle may encounter various different types of objects within different driving environments, including dynamic objects that are capable of movement (e.g., vehicles, motorcycles, bicycles, pedestrians, animals, etc.) and/or static objects (e.g., buildings, road surfaces, trees, signs, barriers, parked vehicles, etc.). In order to safely traverse driving environments, an autonomous vehicle may include various components configured to detect objects and determine attributes of the detected objects. In some examples, a perception component of the autonomous vehicle may include various models and/or components to detect objects based on sensor data, in addition to classifying the objects. One or more prediction components of the autonomous vehicle may use the object detection and classification to generate predicted information (e.g., trajectories, likelihoods associated with trajectories, etc.) associated with the objects.

In some examples, the vehicle may identify relevant objects within an environment based on the predicted information. The vehicle may identify potential interactions (e.g., direct and indirect) between a trajectory followed by the vehicle, and the predicted trajectories of the objects. Based on identifying the potential interactions, the vehicle may determine a respective relevance score for each (e.g., some or all) predicted trajectory for which the vehicle identifies a potential interaction and use the relevance scores to identify the relevant object(s) within the environment.

When identifying relevant objects within an environment, vehicles may misidentify which objects are relevant to the vehicle based on attributing the highest relevance scores with the most relevant objects. In some examples, vehicles may identify the relevant object(s) as object(s) that include predicted trajectory relevance score(s) that satisfy (e.g., are equal to or greater than) a threshold score and/or include relevance score(s) that are within a threshold number of the highest relevance scores. In some situations, identifying relevant object(s) based on the highest overall relevance score(s) may not include the most relevant object(s) within a particular driving scenario. In some examples, an object may include multiple predicted trajectories. Further, in some scenarios, a vehicle may consider multiple candidate trajectories. Depending on which predicted trajectory the object will follow (and/or which candidate trajectory the vehicle may consider following), the various objects within the environment may become more or less relevant to the vehicle. Consequently, the most relevant object(s) may change depending on a particular combination of predicted object trajectories and candidate trajectories. Accordingly, relevant object(s) in one scenario may not be the most relevant in a different scenario.

To address the technical problems and inefficiencies of potentially misidentifying potentially relevant objects within an environment, the techniques described herein include using a relevancy filter-based system (which also may be referred to as a "relevance filter") to determine relevant sample driving scenarios and/or to identify relevant objects for subsequent processing. Initially, the relevance filter may receive a candidate trajectory or path for an autonomous vehicle to follow within an environment. In some examples, the path may be based on a combination of a current position of the vehicle, the vehicle dynamics, and/or map data. Further, a perception component may detect and classify one or more objects within the environment. A prediction component may additionally determine a number of predicted trajectories associated with the object(s). In some examples, the perception and prediction components may send information regarding the objects(s) (e.g., object classification, predicted trajectories, likelihoods of each trajectory, etc.) to the relevance filter.

In some examples, the relevance filter may generate an occupancy area associated with the candidate trajectory. The occupancy area may be an estimation of where the autonomous vehicle may travel based on the autonomous vehicle following the candidate trajectory. In some examples, the relevance filter may determine the length of the occupancy area based on the autonomous vehicle's dynamics and/or capabilities (e.g., maximum and minimum accelerations, maximum and minimum velocities, current velocity, current steering angle and/or heading, maximum and/or minimum steering angles/rates, etc.). Further, the relevance filter may also determine a width associated with the occupancy area. In some examples, the autonomous vehicle may travel along a three-lane highway. In such examples, the relevance filter may determine that the width of the occupancy area may be based on the autonomous vehicle's current lane, and/or the lanes to the left and right of the current lane. In other examples, the width of the occupancy area may be based on a combination of the driving lanes. In some examples, the occupancy area can be determined based on one or more candidate trajectories for the vehicle to consider.

In some examples, the relevance filter may determine that the object's predicted trajectories overlap with the occupancy area. The relevance filter may determine a region of overlap in which the predicted trajectories physically overlap with the occupancy area. In such examples, the relevance filter may determine that the object(s) will physically enter the occupancy area at a future time based on the object(s) following the predicted trajectories. Further, the relevance filter may determine that the predicted trajectories temporally overlap with the autonomous vehicle within the occupancy area (e.g., region of overlap). In such examples, the relevance filter may determine a first time interval in which the autonomous vehicle may enter and exit the region of overlap (e.g., based on an entry time and an exit time associated with the vehicle). Further, the relevance filter may determine a second time interval in which the object(s) may enter and exit the region of interest (e.g., based on an entry time and an exit time associated with the object).

Based on the predicted trajectories physically and temporally overlapping with the autonomous vehicle within the region of interest, the relevance filter may generate relevance scores for the predicted trajectories. The relevance filter may determine relevance scores for each interaction (e.g., predicted trajectory). In some examples, the relevance filter may determine relevance scores based on a variety of factors. Such factors may include a location and/or distance of the physical overlap, a length of time associated with the temporal overlap, a classification of the object(s), a likelihood of the predicted trajectory being used, and/or any other like factor.

In some examples, the relevance filter may generate an interaction graph configured to represent the interaction between the candidate trajectory and the predicted trajectories. An interaction graph may include the predicted trajectories that overlapped with the occupancy area (e.g., direct interaction), in addition to predicted trajectories that indirectly interact with the candidate trajectory. In some examples, the interaction graph may include a node for each of the predicted trajectories. In such examples, the interaction graph may include a node for the candidate trajectory of the autonomous vehicle. Further, the interaction graph may include a node for each predicted trajectory. The nodes may be connected by edges illustrative of the interaction between the two nodes. In some examples, the edge/connection may include the relevance score determined above. In such examples, the interaction graph may include multiple predicted trajectories associated with a single object. As such, the interaction graph may include a number of potential driving scenarios.

In some examples, the relevance filter may determine sample scenarios from the interaction graph. The sample scenarios may be a subset of the interaction graph in which the autonomous vehicle and each of the objects are represented with a single trajectory. In some examples, the relevance filter may sample numerous (e.g., tens, hundreds, thousands, etc.) driving scenarios from the interaction graph. The relevance filter may determine a first sample based on the likelihoods of the predicted trajectories. In such examples, the first sample may include each object's predicted trajectory with the highest likelihood of being selected. Further, the relevance filter may determine one or more other samples by randomly sampling some or all of the predicted trajectories within the interaction graph. In such examples, the random sampling may be weighted based on the predicted trajectory likelihoods. As such, the relevancy filter may determine a number of sample driving scenarios in which each scenario contains a single predicted trajectory for each object.

In some examples, the relevance filter may determine a relevance score for each sample. The relevance filter may use the relevance scores associated with the interactions (e.g., predicted trajectories) to determine a sample relevance score. In some examples, a sample relevance score may be determined using a variety of methods. Such methods may include aggregating or combining relevance scores along edges associated with a sample, adding the relevance scores within the sample (which, in at least some examples, may comprise a weighted sum) and dividing the total by the number of nodes, and the like. Alternatively, methods may include multiplying the relevance scores. Additional methods are discussed in more detail below.

In some examples, the relevance filter may send a number of samples (e.g., a subset of objects with the object's associated predicted trajectory) with the highest relevance scores to a prediction and/or planning component. The relevance filter may determine a threshold number of samples which may be sent to prediction and/or planning components. In such examples, the relevance filter may identify the samples with the highest relevance scores that are above the threshold number. The identified samples may be sent to the prediction and/or planning components. In some examples, the number of samples to send to a prediction and/or planning component can be based on an amount of processing power and/or memory available for a processing operation (e.g., to ensure that a number of samples can be considered within a particular period of time).

In some examples, the prediction and planning components may further analyze the sample scenarios and determine actions for the autonomous vehicle to perform. For instance, the planner component may analyze (e.g., to determine active prediction data and/or to determine predictions and/or a trajectory for the autonomous vehicle to traverse with greater precision) the samples of objects and the associated predicted trajectories that are relevant to the autonomous vehicle (e.g., based on geometric and/or temporal interactions), but not analyze objects or predicted trajectories that are irrelevant to the autonomous vehicle, such as objects that do not include potential interactions with the vehicle or other objects that interact with the vehicle. This may reduce the amount of computing resources required by the prediction and planner components to determine the actions for the autonomous vehicle. Additionally, this may reduce the time it takes for the planner component to determine the actions. Reducing the time it takes for the planner component to determine the actions may increase the overall safety of the vehicle when navigating around the environment. Alternatively, compute resources that may otherwise have been dedicated to irrelevant objects may be dedicated to relevant objects to provide for increased precision in predictions, etc.

As illustrated by these examples, the techniques described herein can improve the functioning, safety, and efficiency of autonomous and semi-autonomous vehicles traversing through driving environments by using samples of the interaction graphs to more efficiently and accurately identify relevant objects within an environment. The relevance filter described herein may improve vehicle safety and driving efficiency by improving the accuracy of identifying relevant objects based on generating and sampling interaction graphs. The improved identifying of relevant objects by the relevance filter can be used to more efficiently and accurately predict object actions, and determine safe trajectories for the autonomous vehicle.

In further examples, by performing the processes describe herein, the autonomous vehicle may reduce the number of objects and predicted trajectories that the planner component analyzes when determining actions for the autonomous vehicle to perform. By reducing the number of objects and predicted trajectories to consider, the relevance filter may reduce the size of data to be processed. Further, the techniques discussed herein can reduce an amount of processing time without reducing an accuracy (or by minimizing any reduction of accuracy) of identifying relevant objects, which can reduce a latency of processing systems. Reducing latency can improve safety outcomes and/or comfort levels by controlling an autonomous vehicle, for example, to alter a trajectory or otherwise navigate the autonomous vehicle safely in an environment The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or robotic platform), and are not limited to autonomous vehicles. In one example, similar techniques may be utilized in driver-controlled vehicles in which such a system may provide an indication of whether it is safe to perform various maneuvers. In other examples, any or all of the techniques described herein may be implemented in other machine vison systems, such as security systems, object inspection and/or quality assurance systems, environment monitoring systems, etc.

FIG. 1 is a pictorial flow diagram illustrating an example process 100 for determining predicted trajectories for objects, determining an occupancy area associated with a vehicle trajectory, determining an interaction graph and relevancy scores, and determining sample relevancy scores. In various examples, some or all of the operations in process 100 may be performed by a relevance filter component integrated within a perception component, a prediction component, a planning component, and/or other components and systems within an autonomous vehicle. For instance, as shown in this example, process 100 may be implemented using a relevance filter 102. As described below in more detail, the relevance filter 102 may include various components, such as a vehicle occupancy component, an interaction graph generator, a sample generator, and/or a sample relevance generator, which may be configured to determine object trajectories, generate an interaction graph, generate sample scenarios from the interaction graph, and/or determine relevant sample driving scenarios.

At operation 104, the relevance filter 102 may identify objects and determine associating predicted trajectories. The relevance filter 102 and/or other components within the perception component of the vehicle may detect objects within the environment based on sensor data. Further, perception and prediction components of the vehicle may determine one or more predicted trajectories associated with the detected objects. For example, box 106 illustrates an autonomous vehicle 108 navigating a driving environment and approaching a junction including a plurality of detected objects. In this example, proximate the junction may include a first object 110, a second object 112, and a third object 114. As shown in box 106, the first object 110 may be a vehicle, the second object 112 may be a vehicle, and the third object 114 may be a pedestrian. However, in other examples there may be additional or fewer objects. Further, in other examples the objects may be a vehicle, pedestrian, animal, cyclist, or any other dynamic object that may be capable of movement.

In some examples, the detected objects may include predicted trajectories. As illustrated, the autonomous vehicle 108 may include a single trajectory or path configured to instruct the autonomous vehicle 108 to navigate through the junction. In some examples, the path may be based on a combination of a current position of the vehicle 108, the vehicle dynamics, and/or map data. Further, object 110 may include two predicted trajectories. A first of the two predicted trajectories of the first object 110 predicts that the first object 110 will navigate straight through the junction. A second of the two predicted trajectories of the first object 110 predicts that the first object 110 will make a left turn in the junction. Further, the second object 112 may include a single trajectory that predicts that the second object 112 will navigate into the junction and turn right. Additionally, the third object 114 may include a single trajectory predicting that the third object 114 leaves a sidewalk and walks into the junction. However, this is not intended to be limiting, the autonomous vehicle 108, the first object 110, the second object 112, and the third object 114 may each include additional predicted trajectories configured to instruct the autonomous vehicle 108 or object(s) to traverse in a number of different directions.

Examples of techniques for predicting trajectories for objects in an environment can be found, for example, in U.S. Pat. No. 11,169,531, issued Nov. 9, 2021, and titled "Trajectory Prediction on Top-Down Scenes," the contents of which is herein incorporated by reference in its entirety and for all purposes.

Figure 3:
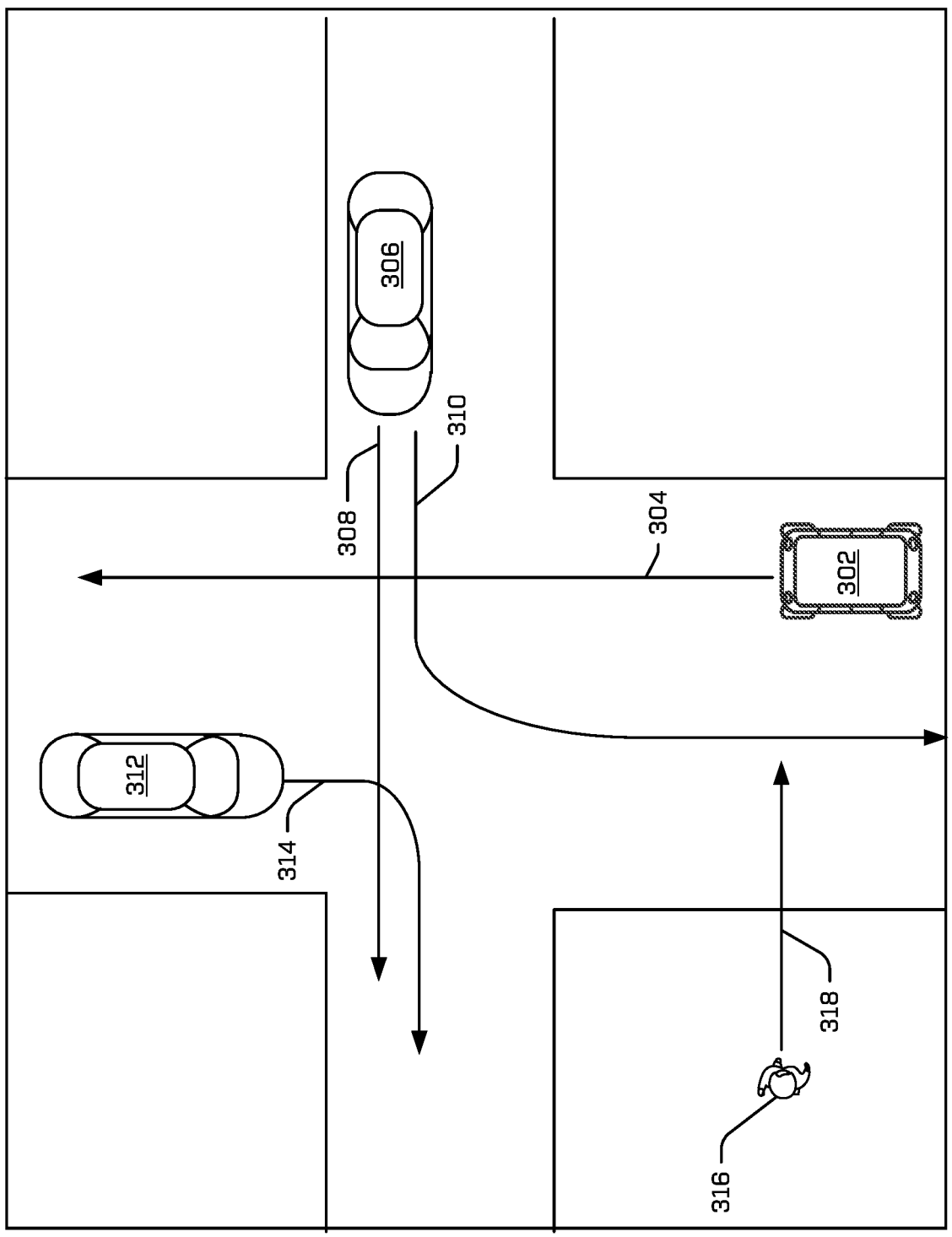
FIG. 3 depicts an example environment of a vehicle approaching a junction including objects with associated predicted trajectories, in accordance with examples of this disclosure.

Additional details of the scenario represented in example 106 are described with respect to FIG. 3, as well as throughout the disclosure.

At operation 116, the relevance filter 102 may determine an occupancy area associated with the autonomous vehicle 108 following its trajectory or path. Box 118 depicts an example in which the relevance filter 102 has generated an occupancy area 120 associated with the trajectory or path of the autonomous vehicle 108. The occupancy area 120 may be illustrative of an area within which the autonomous vehicle 108 may occupy if the autonomous vehicle 108 follows the trajectory or path. Accordingly, the relevance filter 102 may use the occupancy area 120 to determine whether there are potential interactions with other objects. In some examples, the relevance filter 102 may determine that there may be a potential interaction based on determining whether the object's predicted trajectories enter the occupancy area 120.

In some examples, the relevance filter 102 may determine a size of the occupancy area 120. The relevance filter 102 may generate the size of the occupancy area 120 based on the autonomous vehicle's 108 dynamics (e.g., minimum and maximum accelerations, maximum velocity, current velocity, current, maximum, and minimum steering angles and/or rates, etc.), environment state data (e.g., state of a traffic light, a state of a railroad crossing, a state of a road condition, a state of the weather, state of road type, etc.), and other like factors. In some examples, the relevance filter 102 may determine a length of the occupancy area 120 by determining how far the autonomous vehicle 108 may travel within a pre-determined period of time. In such examples, the relevance filter 102 may determine a current velocity, a maximum velocity, a maximum acceleration, and environment state data of the autonomous vehicle 108. Based on such information, the relevancy filter 102 may determine a distance the autonomous vehicle 108 may travel based on the autonomous vehicle 108 applying maximum acceleration and/or traveling at a maximum velocity for the pre-determined period of time.

Further, the relevance filter 102 may determine a width of the occupancy area 120. In some examples, the relevance filter 102 may determine the type of road (e.g., one-way, two-way, three-lane, etc.) the autonomous vehicle 108 is traveling on, in addition to where the trajectory or path instructs the autonomous vehicle 108 to traverse (e.g., straight, make right turn, change lane, etc.). In some examples, in determining the width of the occupancy area 120, the relevance filter 102 may consider the autonomous vehicle's 108 current lane, the left lane, and/or the right lane. In such examples, a single lane may be used to determine the width of the occupancy area 120. In other examples, a combination of lanes may be used to determine the width of the occupancy area 120.

In some examples, the relevance filter 102 may determine whether the predicted trajectories of the first object 110, the second object 112, and/or the third object 114 interact with the occupancy area 120. A predicted trajectory may interact with the occupancy area 120 based on physically occupying a region of interest (e.g., an intersection) within the occupancy area 120 during an overlapping time interval with the autonomous vehicle 108. In some examples, the relevance filter 102 may determine that the predicted trajectory temporally overlaps the region of interest with the autonomous vehicle 108. In some examples, the relevance filter 102 may determine a first entry time and a first exit time of the object (e.g., following the predicted trajectory) occupying the region of interest. The relevance filter 102 may also determine a second entry time and a second exit time of the autonomous vehicle 108 (e.g., following the trajectory) occupying the region of interest (e.g., an intersection). In such examples, the relevance filter 102 may determine a temporal overlap between the object's first entry time and first exit time, and the autonomous vehicle's 108 second entry time and second exit time. In some examples, the relevance filter 102 may first determine that there is a direct interaction (e.g., physically and/or temporally) between the occupancy area 120 and a predicted trajectory of an object. Based on determining the direct interaction, the relevance filter 102 may also determine one or more indirect interactions between two or more objects. In some examples, the relevance filter 102 may determine that there is an indirect interaction between two objects using similar processes that the vehicle uses to determine the direct interactions. Examples of techniques for determining direct and indirect interactions can be found, for example, in U.S. patent application Ser. No. 17/550,996, filed Dec. 14, 2021, and titled "Identifying Relevant Objects Within An Environment," the entirety of which is herein incorporated by reference in its entirety.

At operation 122, the relevance filter 102 may generate an interaction graph and determine relevance scores. The relevance filter 102 may generate relevance scores for each of the direct and indirect interactions before generating an interaction graph, or after generating an interaction graph. In some examples, the relevance filter 102 may generate a relevance score for each predicted trajectory that was determined to directly or indirectly interact with the occupancy area 120. In such examples, the relevance scores may be generated from the perspective of the autonomous vehicle 108 (e.g., indicating how relevant a particular predicted trajectory is to the autonomous vehicle 108). In some cases, the autonomous vehicle 108 can be represented as a root node of the interaction graph. Relevance scores may be within a given range, such as 0 to 1, in which 1 may be highly relevant and 0 may be minimally relevant. However, this is not intended to be limiting, the given range may be expanded to go over 1 and/or below 0, in addition to 0 being highly relevant and 1 being minimally relevant. In some examples, the relevance filter 102 may determine relevance scores based on a number of factors. In such examples, factors may include a location of the physical overlap, a distance of the physical overlap from the autonomous vehicle 108, a length of time associated with the temporal overlap, a classification of the object(s), a likelihood of the predicted trajectory being used, and/or any other like factor. In some examples, the factors may be weighted equally. Alternatively, the relevance filter 102 may weigh factors differently.

In some examples, the relevance filter 102 may generate an interaction graph. The interaction graph is representative of pairwise interactions between objects in the environment. The interactions between two nodes may be direct interactions between two objects within an environment. The interaction graph may be illustrative of some or all direct and indirect interactions with the occupancy area 120. In some examples, traversing along the edges of the interaction graph may additionally show indirect interactions of the driving scenario. Box 124 depicts an example in which an interaction graph has been generated. The interaction graph may include a plurality of nodes indicative of each predicted trajectory that interacts (e.g., directly or indirectly) with the occupancy area 120. As shown in box 124, the interaction graph may include a first node 126 (e.g., illustrative of the trajectory for the autonomous vehicle 108), a second node 128 (e.g., illustrative of the first predicted trajectory of object 110), a third node 130 (e.g., illustrative of the predicted trajectory of object 112), a fourth node 132 (e.g., illustrative of the second predicted trajectory of object 110), and a fifth node 134 (e.g., illustrative of the predicted trajectory of object 114). In some examples, the nodes may be connected by edges illustrating the interaction between the two predicted trajectories. As shown in box 124, the edges may include relevance scores illustrating the degree to which a predicted trajectory is relevant to the autonomous vehicle 108. Accordingly, the interaction graph, as shown in box 124, may include two different driving scenarios, the first being if object 110 follows the first predicted trajectory, and the second being if the object 110 follows the second predicted trajectory.

Figure 4:
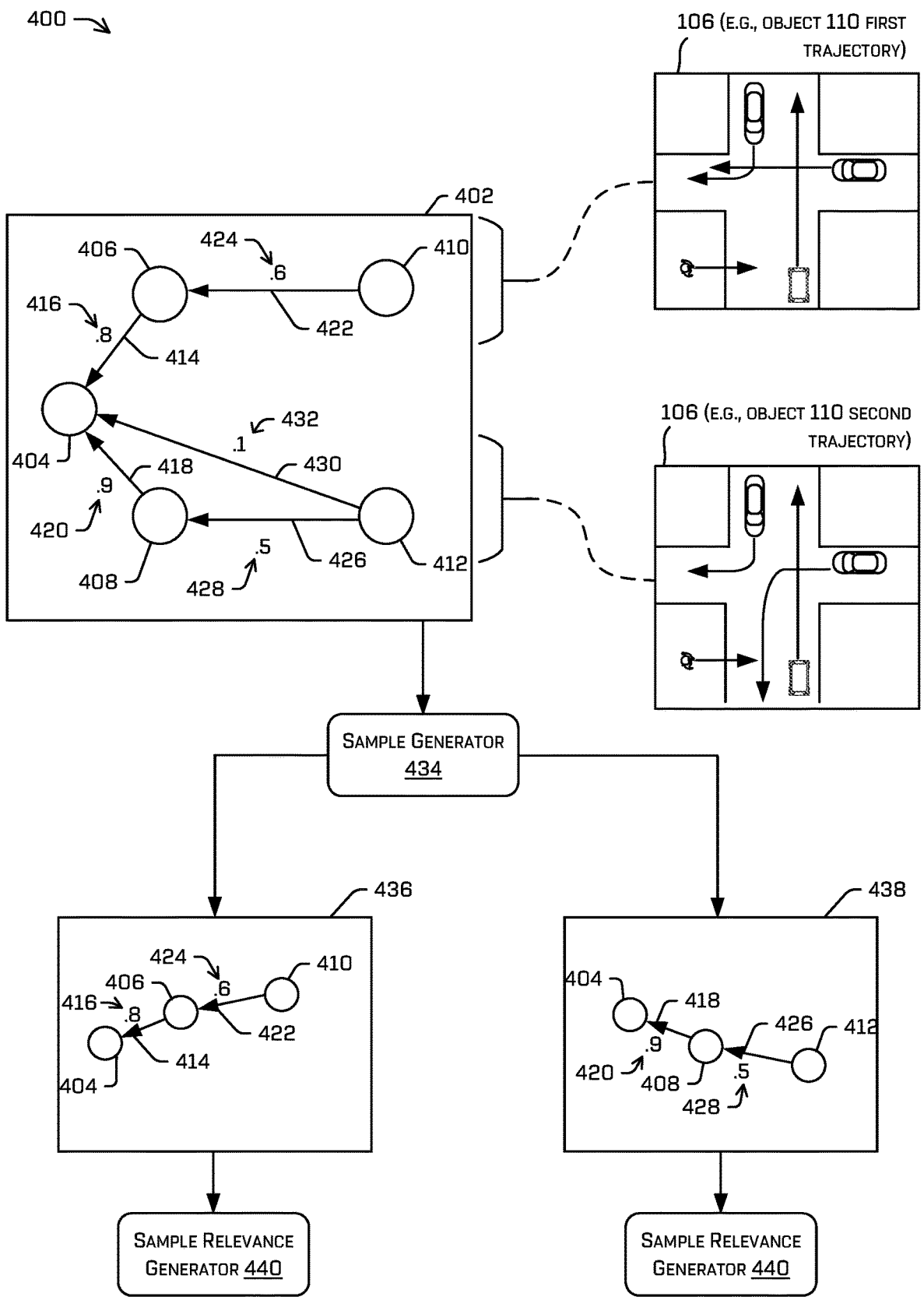
FIG. 4 is a pictorial flow diagram of an example process of generating an interaction graph, generating samples from the interaction graph, and generating sample relevancy scores.

Additional details of the interaction graph illustrated in example 124 are described with respect to FIG. 4, as well as throughout the disclosure.

At operation 136, the relevance filter 102 may determine relevance scores associated with sample scenarios. In some examples, the relevance filter 102 may determine sample driving scenarios, and generate relevance scores associated with the sample scenario. A sample may include each object that is connected to edges leading to the autonomous vehicle 108 trajectory node 126. In such examples, each object may be represented with a single trajectory (e.g., an object can only perform a single trajectory). For example, box 138 illustrates a first sample scenario of the interaction graph. The relevance filter may sample multiple scenarios from an interaction graph. In some examples, the relevance filter 102 may determine a relevance score associated with the sample illustrated in box 138. As described in more detail below (FIG. 4), the relevance filter 102 may use a number of different methods to generate sample relevance scores. The sample relevance scores may be indicative of the degree to which the particular sample scenario is relevant to the autonomous vehicle 108. In some examples, an overall relevance score for a particular branch of the interaction graph can be determined based on aggregating or otherwise combining the relevancy scores between nodes.

Figure 2:
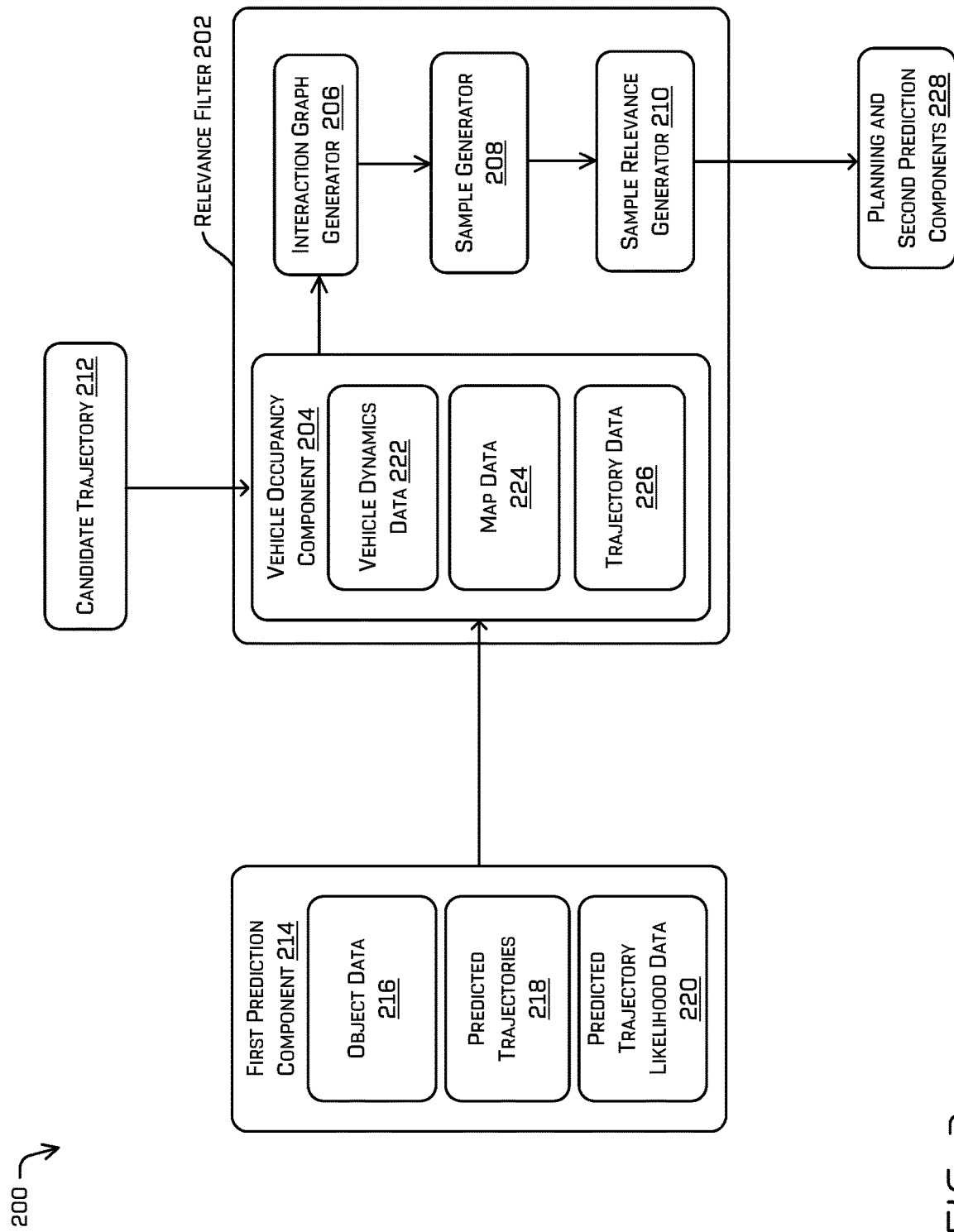
FIG. 2 illustrates an example computing system including a relevance filter configured to determine relevant driving scenarios, in accordance with examples of the disclosure.

FIG. 2 illustrates an example computing system 200 including an example relevance filter 202 configured to determine relevant driving scenarios. In some examples, the relevance filter 202 may be similar or identical to the relevance filter 102 described above, or in any other examples herein. As noted above, in some cases the relevance filter 202 may be implemented within or otherwise associated with a perception component, prediction component, and/or planning component of an autonomous vehicle. In some examples, the relevance filter 202 may include various components, described below, configured to perform different functionalities of a sample-based relevancy technique. In some examples, the relevance filter 202 may include a vehicle occupancy component 204 configured to generate an occupancy area associated with a trajectory of the autonomous vehicle. Additionally, the relevance filter 202 may include an interaction graph generator 206 configured to generate interaction graphs, a sample generator 208 configured to determine sample scenarios from the interaction graphs, and/or a sample relevance generator 210 configured to generate relevance scores associated with the sample scenario.

In some examples, the relevance filter 202 may receive a candidate trajectory 212 for a vehicle. In some examples, the candidate trajectory 212 may be a trajectory for a vehicle to follow. In other examples, the candidate trajectory 212 may be a path of the vehicle based on a combination of a current position of the vehicle, the vehicle dynamics, and/or map data. The candidate trajectory 212 may be generated by one or more of a perception system, prediction system, or a planning system. Such systems may transmit the candidate trajectory 212 to the relevance filter 202.

In some examples, the relevance filter 202 may receive object information from a first prediction component 214. Perception and prediction components may receive sensor data representative of a driving environment. The perception component may be configured to detect and classify objects within the environment based on the sensor data. In some examples, the perception component may send object information to the first prediction component 214. The first prediction component 214 may include various components, described below, to receive, store, synchronize, and/or analyze particular object information received by the perception component. In this example, the first prediction component 214 may include an object data 216 component configured to store and/or synchronize object data received from the perception components. Further, the first prediction component 214 may include a predicted trajectories component 218 configured to store predicted trajectories associated with objects received from the perception component. Further, the first prediction component 214 may include a predicted trajectory likelihood data component 220 configured to store and/or synchronize likelihood data associated with predicted trajectories. Likelihood data may indicate a probability a particular predicted trajectory will be followed or traversed by the object. In some examples, likelihood data may be generated based on environmental state data, current vehicle dynamics/characteristics (e.g., current velocity of object, object blinker is on, etc.), or any other like information. Examples of techniques for predicting trajectories can be found, for example, in U.S. Pat. No. 11,169,531, issued Nov. 9, 2021, and titled "Trajectory Prediction on Top-Down Scenes," the entirety of which is herein incorporated by reference for all purposes.

In some examples, the relevance filter 202 may include a vehicle occupancy component 204 configured to generate an occupancy area associated with the candidate trajectory 212 of the vehicle. The vehicle occupancy component 204 may receive the vehicle's candidate trajectory 212, in addition to receiving object data 216, predicted trajectories 218 associated with objects, and predicted likelihood data 220 from the first prediction component 214. In some examples, the vehicle occupancy component 204 may include various components, described below, to receive, store, synchronize, and/or generate occupancy areas. The vehicle occupancy component 204 may include a vehicle dynamics data 222 component. In some examples, vehicle dynamics data 222 may include maximum and minimum accelerations, maximum velocity, current velocity, and other like information. The vehicle dynamics data 222 may be used to determine the length of an occupancy area and/or time window associated with traversing the occupancy area. In some examples, the vehicle occupancy component 204 may include a map data 224 component. In some examples, the map data 224 may be a map of an environment based on sensor data that has been obtained from a variety of sensors (e.g., lidar, radar, image, etc.). The map data 224 may provide information about environmental data, vehicle data, among other data. In some examples, the vehicle occupancy component 204 may include trajectory data 226 configured to store and synchronize trajectory data (e.g., candidate trajectory 212, predicted trajectories 218, predicted trajectory likelihood data 220, etc.).

As noted above, the relevance filter 202 may include an interaction graph generator 206 configured to generate an interaction graph. In some examples, the vehicle occupancy component 204 may send information (e.g., occupancy area, trajectory data 226, candidate trajectory 212, map data 224, vehicle dynamics data 222, etc.) to the interaction graph generator 206.

In some examples, the relevance filter 202 may include a sample generator 208 configured to generate a number of sample scenarios based on the interaction graph. The sample generator 208 may generate samples based on the predicted trajectory likelihood data 220. The sample generator 208 may generate a first sample in which each object's predicted trajectories 218 with the highest likelihood is selected. In some examples, the sample generator 208 may generate one or more other samples based on randomly selecting predicted trajectories from each object. In such examples, the random selection of predicted trajectories may be based on the predicted likelihood for the predicted trajectories. In at least some such examples, the random sampling may be weighted based at least in part on the likelihood. Accordingly, a predicted trajectory with a high likelihood may be randomly selected at a higher rate than a predicted trajectory with a low likelihood.

In some examples, the relevance filter 202 may include a sample relevance generator 210 configured to generate relevancy scores for each sample. The sample relevance generator 210 may determine a sample relevancy score using a variety of methods. Such methods may include averaging the relevancy scores for each interaction. Alternatively, methods to determine a sample relevance score may include multiplying the relevance scores. In some examples, some predicted trajectories may directly interact with the occupancy area, and some predicted trajectories may indirectly interact with the occupancy area. In such examples, the sample relevance generator 210 may consider and/or evaluate the direct and indirect interactions the same, and in other examples the sample relevance generator 210 may weight direct and indirect interactions differently.

Based on the sample relevance scores, the sample relevance generator 210 and/or the relevance filter 202 may send samples to planning and second prediction components 228. In some examples, the relevance filter 202 and/or the sample relevance generator 210 may determine a threshold value above which the samples may be sent to the planning and second prediction components 228.

FIG. 3 depicts an example environment 300 of a vehicle 302 approaching a junction including objects with associated predicted trajectories.

In some examples, the example environment 300 may be similar or identical to the environment of FIG. 1. As described above, the example environment 300 may include a number of objects approaching a junction. In some examples, the example environment 300 may include a vehicle 302. In some examples, the vehicle 302 include a candidate trajectory 304 configured to instruct the vehicle 302 to traverse directly through the junction. The example environment 300 may also include a first object 306 which may be approaching the junction. In some examples, the first object 306 may include a first predicted trajectory 308 and a second predicted trajectory 310. The first predicted trajectory 308 may predict that the first object 306 will traverse directly through the junction. The second predicted trajectory 310 may predict that the first object 306 will traverse into the junction and turn left. The example environment 300 may include a second object 312 that may be approaching the junction. In some examples, the second object 312 may include a predicted trajectory 314 which may predict that the second object 312 will traverse into the junction and turn right. Additionally, the example environment 300 may include a third object 316 which may be on a sidewalk portion facing the road. In some examples, the third object 316 may include a predicted trajectory 318 that may lead directly onto the road.

As described above, the example environment 300 may include a variety of different objects. In some examples, the first object 306 may be a vehicle, the second object 312 may be a vehicle, and the third object 316 may be a pedestrian. However, this is not intended to be limiting, as the first object 306, the second object 312, and the third object 316 may be a vehicle, pedestrian, animal, cyclist, or any other dynamic object that may be capable of movement.

In some examples, the example environment 300 may include a number of different driving scenarios. In a first scenario, the vehicle 302 may follow candidate trajectory 304, the first object 306 may follow the first predicted trajectory 308, the second object 312 may follow predicted trajectory 314, and the third object may follow predicted trajectory 318. Based on the first scenario, the vehicle 302 may determine which object(s) may be relevant to the vehicle's 302 candidate trajectory 304. In such examples, the first object 306 may directly interact with the vehicle 302, as the first predicted trajectory 308 of the first object 306 predicts that the first object 306 will traverse directly over the candidate trajectory 304 (e.g., the first object 306 may cross in front of the vehicle 302). Further, the second object 312 may indirectly interact with the vehicle 302, as the first predicted trajectory 308 predicts that the first object 306 will traverse directly across the predicted trajectory 314 of the second object 312. In such examples, the first object 306 may yield and/or stop to wait for the second object 312 to pass before proceeding along the first predicted trajectory 308. In some examples, the first object 306 may yield and/or stop in the direct path of the candidate trajectory 304, causing a direct interaction between the vehicle 302 and the first object 306, and an indirect interaction between the vehicle 302 and the second object 312. Based on the first scenario, the third object 316 may directly interact with the path or candidate trajectory 304 of the vehicle 302. In some examples, the third object 316 may follow predicted trajectory 318 which may lead the third object 316 directly across the candidate trajectory 304 of the vehicle 302. Accordingly, in the first scenario, the first object 306 (e.g., direct interaction), the second object 312 (e.g., indirect interaction), and the third object 316 (e.g., direct interaction) may be the relevant objects for the vehicle 302 to consider.

In a second scenario, the vehicle 302 may follow candidate trajectory 304, the first object 306 may follow the second predicted trajectory 310, the second object 312 may follow predicted trajectory 314, and the third object may follow predicted trajectory 318. Based on the second scenario, the vehicle 302 may determine which object(s) may be relevant to the vehicle's 302 candidate trajectory 304. In such examples, the first object 306 may directly interact with the vehicle 302, as the first object's 306 second predicted trajectory 310 predicts the first object 306 to traverse directly over the candidate trajectory 304. Further, the third object 316 may indirectly interact with the vehicle 302, as the second predicted trajectory 310 predicts the first object 306 to traverse directly across the predicted trajectory 318 of the third object 316. In such examples, the first object 306 may yield and/or stop to wait for the third object 316 to pass before proceeding. In some examples, the first object 306 may yield and/or stop in the direct path of the candidate trajectory 304, causing a direct interaction between the vehicle 302 and the first object 306, and an indirect interaction between the vehicle 302 and the third object 316. In some examples, the third object 316 may directly interact with the candidate trajectory 304 of the vehicle 302. In such examples, the third object 316 may follow predicted trajectory 318 which may lead the third object 316 directly across the candidate trajectory 304 of the vehicle 302. Based on the second scenario, the second object 312 neither directly nor indirectly interacts with the path of the vehicle 302. Accordingly, in the second scenario, the first object 306 (e.g., direct interaction) and the third object 316 (e.g., direct and indirect interaction) may be the relevant objects for the vehicle 302 to consider.

FIG. 4 is a pictorial flow diagram of an example process 400 of generating an interaction graph 402, generating samples from the interaction graph 402, and generating sample relevance scores.

In some examples, the interaction graph 402 may be similar or identical to the interaction graph of FIG. 1. As described above, the example process 400 may include an interaction graph 402. The interaction graph 402 may illustrate the relationships between a vehicle trajectory and the direct and indirect interactions with predicted trajectories of one or more objects within an environment. In some examples, the interaction graph may include one or more nodes illustrative of a predicted trajectory. As shown in the process 400, the interaction graph 402 may include a node 404 representative of the vehicle trajectory. The interaction graph 402 may include a node 406 representative of a first predicted trajectory of a first object. Further, the interaction graph 402 may include a node 408 representative of a second predicted trajectory of the first object, a node 410 representative of a predicted trajectory of a second object, and a node 412 representative of a predicted trajectory of a third object.

In some examples, the interaction graph 402 may include edges/connections configured to connect two nodes. Edges may represent a direct interaction between the two nodes by which the edge connects. In some examples, edges may include a relevance score representative of the degree to which a particular interaction is relevant to the vehicle trajectory (e.g., node 404). Further, an edge may include an arrow indicating the node to which the arrow points is affected by the node with which the edge connects. As shown in process 400, the interaction graph 402 may include an edge 414 connecting the node 404 with the node 406. The edge 414 indicates that there is a direct interaction between node 406 and node 404, and the interaction may include a relevance score 416 of 0.8. The interaction graph 402 may also include an edge 418 connecting the node 404 with the node 408. The edge 418 may include a relevance score 420 of 0.9. In some examples, an edge 422 may connect the node 410 with the second node 406. The edge 422 may include a relevance score 424 of 0.6. In some examples, an edge 426 may connect the node 412 with the node 408. The edge 426 may include a relevance score 428 of 0.5. The interaction graph 402 may include an edge 430 connecting the node 412 with the node 404. The edge 430 may include a relevance score 432 of .1. In some examples, the interaction graph 402 may include a number of different driving scenarios. As shown in in FIG. 4, node 404, node 406, node 410, and each connecting edge may represent a driving scenario similar to that of example box 106 (e.g., may be the same or similar to that of FIG. 1 or 3; object 110 following the first trajectory). Further, node 404, node 408, node 412, and each connecting edge may represent a driving scenario similar to that of example box 106 (e.g., object 110 following the second trajectory). Of course, the relevance scores discussed herein are merely examples and are not intended to be limiting.

In the example process 400, the interaction graph 402 may be sent to a sample generator 434. As described above, the sample generator 434 may be configured to generate one or more sample driving scenarios for the relevance filter to evaluate. In some examples, the sample generator 434 may output one or more samples from the interaction graph 402. The sample generator 434 may generate a first sample 436 and a second sample 438. However, this is not intended to be limiting, the sample generator 434 may generate additional or fewer samples. The first sample 436 may include the node 404, the node 406, and the node 410. In some examples, the first sample may be illustrative of the first scenario from FIG. 3 in which the first node 404 is the candidate trajectory 304, the node 406 may be the first predicted trajectory 308 of the first object 306, and the node 410 may be the predicted trajectory 314 of the second object 312. In some examples, the second sample 438 may include the node 404, the node 408, and node 412. In some examples, the second sample may be illustrative of the second scenario from FIG. 3 in which the node 404 is the candidate trajectory 304, the node 408 is the second predicted trajectory 310 of the first object 306, and node 412 may be the predicted trajectory 318 of the third object 316. Further, though not shown, the sample generator 434 may also generate another sample which may include the node 412 and the node 404. In some examples, this additional sample may represent the third object 316 directly interacting with the vehicle 302.

In some examples, the sample generator 434 may send the first sample 436 and the second sample 438 to a sample relevance generator 440. The sample relevance generator 440 may be configured to generate a relevance score for the first sample 436 and a relevance score for the second sample 438. In some examples, the sample relevance generator 440 may process the first sample 436 the second sample 436, and any additional samples in parallel.

Figure 5:
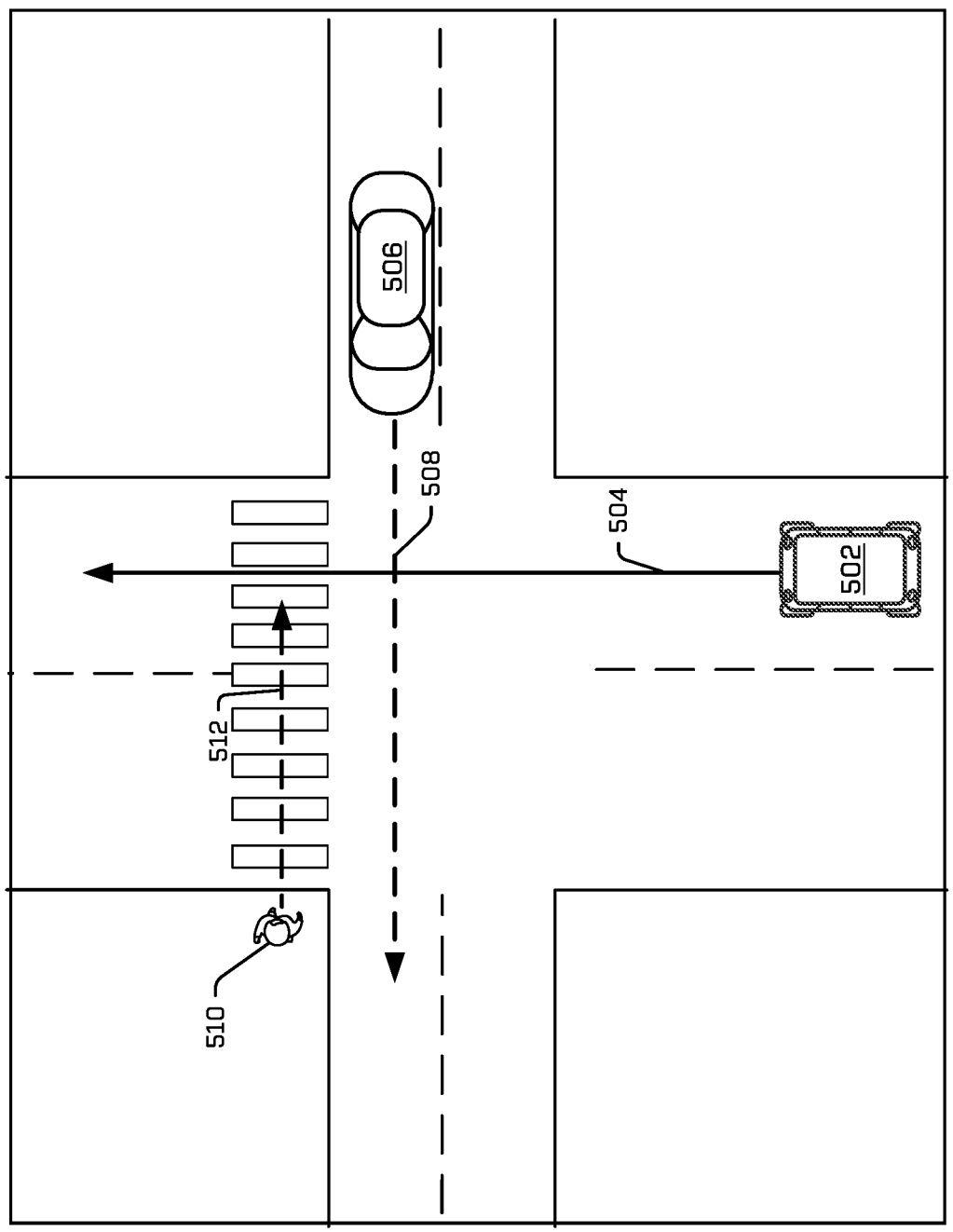
FIG. 5 depicts an example environment of a vehicle approaching a junction including objects which may be stopped or yielding, in accordance with examples of this disclosure.

FIG. 5 depicts an example environment 500 of a vehicle 502 approaching a junction including objects which may be stopped or yielding.

The example environment 500 may include a number of objects stopped and/or yielding at a junction. In some examples, the example environment 500 may include the vehicle 502. The vehicle 502 may include a candidate trajectory 504 configured to instruct the vehicle 502 to traverse through the junction. The example environment 500 may include a first object 506 which may be stopped at the junction. Further, the example environment may include a second object 510 which may be yielding at the junction.

Based on an object yielding or being stopped at a junction, the relevance filter may extend the object's trajectory to extend at least a portion of a distance through the junction. Extending an objects trajectory through a junction may enable the vehicle 502 to more accurately and efficiently evaluate the actions of objects that may affect the candidate trajectory 504 of the vehicle 502. Accordingly, the relevance filter may determine whether an object has a velocity below a particular threshold (e.g., stopped or yielding). Based on the object's velocity being below the particular threshold, the relevance filter may extend the predicted trajectory of the object to extend through the junction. As shown in the example environment 500, the relevancy filter may receive information that the first object 506 and the second object 510 may be yielding or are stopped. In such examples, the relevance filter may extend the predicted trajectory 508 to extend through the junction. Further, the relevance filter may also extend the predicted trajectory 512 to extend through the junction.

Figure 6:
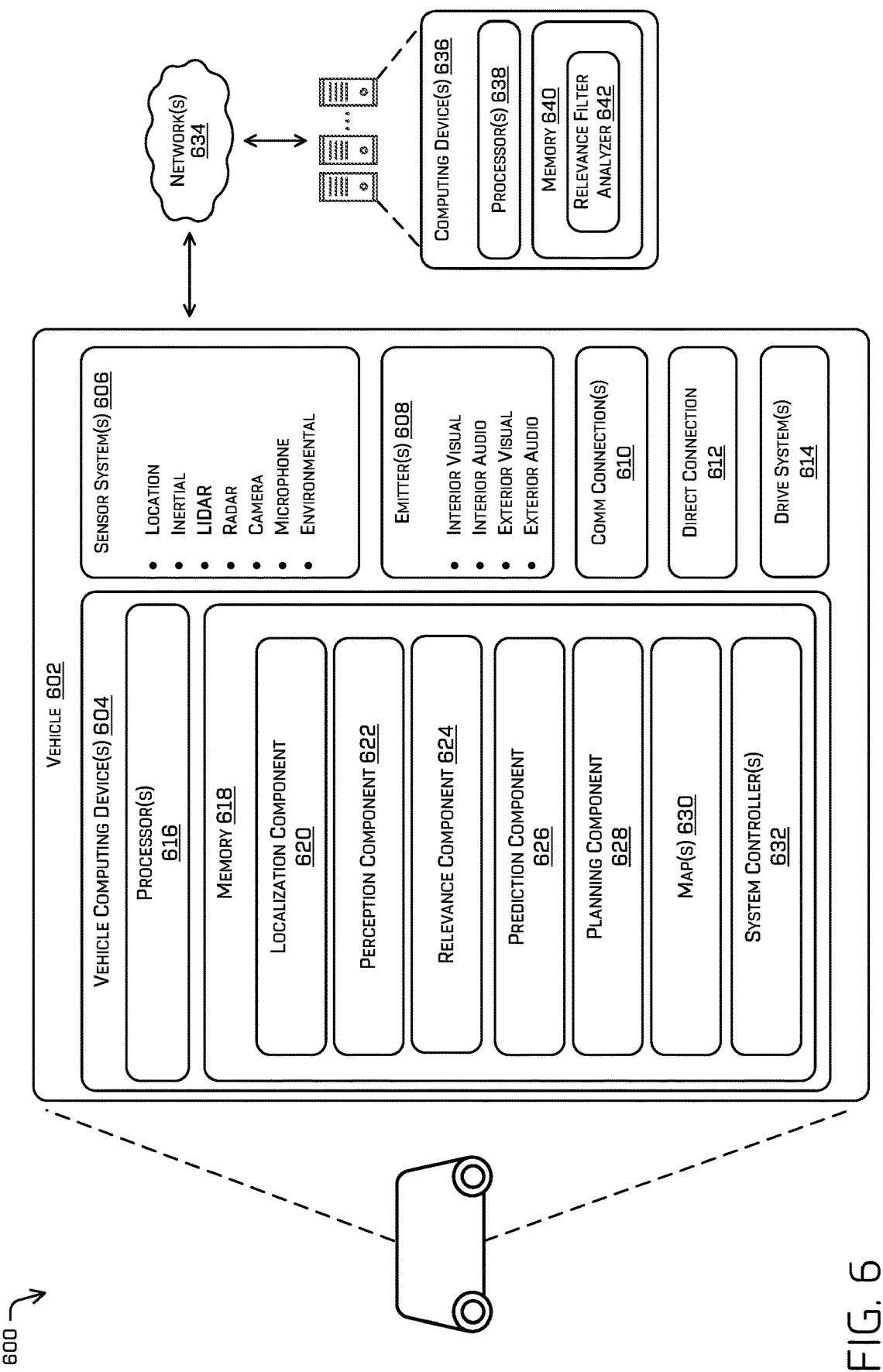
FIG. 6 depicts a block diagram of an example system for implementing various techniques described herein.

FIG. 6 is a block diagram of an example system 600 for implementing the techniques described herein. In at least one example, the system 600 may include a vehicle, such as vehicle 602.

The vehicle 602 may include one or more vehicle computing devices 604, one or more sensor systems 606, one or more emitters 608, one or more communication connections 610, at least one direct connection 612, and one or more drive systems 614.

The vehicle computing device 604 may include one or more processors 616 and memory 618 communicatively coupled with the processor(s) 616. In the illustrated example, the vehicle 602 is an autonomous vehicle; however, the vehicle 602 could be any other type of vehicle, such as a semi-autonomous vehicle, or any other system having at least an image capture device (e.g., a camera enabled smartphone). In some instances, the autonomous vehicle 602 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 602 may be a fully or partially autonomous vehicle having any other level or classification.

In the illustrated example, the memory 618 of the vehicle computing device 604 stores a localization component 620, a perception component 622, a prediction component 626, a relevance component 624, a planner component 628, one or more system controllers 632, and one or more maps (represented by map data 630). Though depicted in FIG. 6 as residing in the memory 618 for illustrative purposes, it is contemplated that the localization component 620, the perception component 622, the prediction component 626, the relevance component 624, the planner component 628, system controller(s) 632, and/or the map(s) may additionally, or alternatively, be accessible to the vehicle 602 (e.g., stored on, or otherwise accessible by, memory remote from the vehicle 602, such as, for example, on memory 640 of one or more remote computing device 636). In some examples, the memory 640 may include a relevance filter analyzer 642.

In at least one example, the localization component 620 may include functionality to receive sensor data from the sensor system(s) 606 to determine a position and/or orientation of the vehicle 602 (e.g., one or more of an x-, y-, z-position, roll, pitch, or yaw). For example, the localization component 620 may include and/or request/receive a map of an environment, such as from map(s) 630, and may continuously determine a location and/or orientation of vehicle 602 within the environment. In some instances, the localization component 620 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the vehicle 602. In some instances, the localization component 620 may provide data to various components of the vehicle 602 to determine an initial position of the vehicle 602 for determining the relevance of an object to the vehicle 602, as discussed herein.

In some instances, the perception component 622 may include functionality to perform object detection, segmentation, and/or classification. In some examples, the perception component 622 may provide processed sensor data that indicates a presence of an object (e.g., entity) that is proximate to the vehicle 602 and/or a classification of the object as an object type (e.g., car, pedestrian, cyclist, animal, building, tree, road surface, curb, sidewalk, unknown, etc.). In some examples, the perception component 622 may provide processed sensor data that indicates a presence of a stationary entity that is proximate to the vehicle 602 and/or a classification of the stationary entity as a type (e.g., building, tree, road surface, curb, sidewalk, unknown, etc.). In additional or alternative examples, the perception component 622 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 626 (which may represent, and/or include, the first prediction component 214) may generate one or more probability maps representing prediction probabilities of possible locations of one or more objects in an environment. For example, the prediction component 626 may generate one or more probability maps for vehicles, pedestrians, animals, and the like within a threshold distance from the vehicle 602. In some instances, the prediction component 626 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 626 may generate predicted trajectories of objects (e.g., objects) in an environment. For example, the prediction component 626 may generate one or more predicted trajectories for objects within a threshold distance from the vehicle 602. In some examples, the prediction component 626 may measure a trace of an object and generate a trajectory for the object based on observed and predicted behavior.

The relevance component 624 may be configured to determine, using one or more of the processes described herein, sample relevance scores associated with objects located within the environment. For example, the relevance component 624 may be configured to determine the relevance scores associated with predicted trajectories of objects that include direct interactions with the vehicle 602 Additionally, the relevance component 624 may be configured to determine relevance scores associated with predicted trajectories of objects that include indirect interactions with the vehicle 602. The relevance component 624 may generate an interaction graph including the direct and indirect interactions to the vehicle 602. The relevance component 624 may further determine sample scenarios from the interaction graph. Such samples may be processed and a relevance score for the sample may be determined.

In general, the planner component 628 may determine a path for the vehicle 602 to follow to traverse through an environment. For example, the planner component 628 may determine various routes and trajectories and various levels of detail. For example, the planner component 628 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 628 may generate an instruction for guiding the vehicle 602 along at least a portion of the route from the first location to the second location. In at least one example, the planner component 628 may determine how to guide the vehicle 602 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 628 may select a trajectory for the vehicle 602.

In other examples, the planner component 628 may alternatively, or additionally, use data from the localization component 620, the perception component 622, and/or the prediction component 626 to determine a path for the vehicle 602 to follow to traverse through an environment. For example, the planner component 628 may receive data (e.g., object data) from the localization component 620, the perception component 622, and/or the prediction component 626 regarding objects associated with an environment. In some examples, the planner component 628 receives data for relevant objects within the environment. Using this data, the planner component 628 may determine a route to travel from a first location (e.g., a current location) to a second location (e.g., a target location) to avoid objects in an environment. In at least some examples, such a planner component 628 may determine there is no such collision free path and, in turn, provide a path which brings vehicle 602 to a safe stop avoiding all collisions and/or otherwise mitigating damage.

In at least one example, the vehicle computing device 604 may include one or more system controllers 632, which may be configured to control steering, propulsion, braking, safety, emitters, communication, and other systems of the vehicle 602. The system controller(s) 632 may communicate with and/or control corresponding systems of the drive system(s) 614 and/or other components of the vehicle 602.

The memory 618 may further include one or more maps 630 that may be used by the vehicle 602 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 602 may be controlled based at least in part on the map(s) 630. That is, the map(s) 630 may be used in connection with the localization component 620, the perception component 622, the prediction component 626, and/or the planner component 628 to determine a location of the vehicle 602, detect objects in an environment, generate routes, determine actions and/or trajectories to navigate within an environment.

In some examples, the one or more maps 630 may be stored on a remote computing device(s) (such as the computing device(s) 636) accessible via network(s) 634. In some examples, multiple maps 630 may be stored based on, for example, a characteristic (e.g., type of entity, time of day, day of week, season of the year, etc.). Storing multiple maps 630 may have similar memory requirements, but increase the speed at which data in a map may be accessed.

In some instances, aspects of some or all of the components discussed herein may include any models, techniques, and/or machine learned techniques. For example, in some instances, the components in the memory 618 (and the memory 640, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 606 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 may include multiple instances of each of these or other types of sensors. For instance, the lidar sensors may include individual lidar sensors located at the corners, front, back, sides, and/or top of the vehicle 602. As another example, the camera sensors may include multiple cameras disposed at various locations about the exterior and/or interior of the vehicle 602. The sensor system(s) 606 may provide input to the vehicle computing device 604. Additionally, or in the alternative, the sensor system(s) 606 may send sensor data, via the one or more networks 634, to the one or more computing device(s) 636 at a particular frequency, after a lapse of a predetermined period of time, in near real-time, etc.

The vehicle 602 may also include one or more emitters 608 for emitting light and/or sound. The emitter(s) 608 may include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 may also include one or more communication connections 610 that enable communication between the vehicle 602 and one or more other local or remote computing device(s). For instance, the communication connection(s) 610 may facilitate communication with other local computing device(s) on the vehicle 602 and/or the drive system(s) 614. Also, the communication connection(s) 610 may allow the vehicle to communicate with other nearby computing device(s) (e.g., remote computing device 636, other nearby vehicles, etc.) and/or one or more remote sensor system(s) for receiving sensor data. The communications connection(s) 610 also enable the vehicle 602 to communicate with a remote teleoperations computing device or other remote services.

The communications connection(s) 610 may include physical and/or logical interfaces for connecting the vehicle computing device 604 to another computing device or a network, such as network(s) 634. For example, the communications connection(s) 610 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 may include one or more drive systems 614. In some examples, the vehicle 602 may have a single drive system 614. In at least one example, if the vehicle 602 has multiple drive systems 614, individual drive systems 614 may be positioned on opposite ends of the vehicle 602 (e.g., the front and the rear, etc.). In at least one example, the drive system(s) 614 may include one or more sensor systems to detect conditions of the drive system(s) 614 and/or the surroundings of the vehicle 602. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 614. In some cases, the sensor system(s) on the drive system(s) 614 may overlap or supplement corresponding systems of the vehicle 602 (e.g., sensor system(s) 606).

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 614. Furthermore, the drive system(s) 614 may also include one or more communication connection(s) that enable communication by the respective drive module with one or more other local or remote computing device(s).

In at least one example, the direct connection 612 may provide a physical interface to couple the one or more drive system(s) 614 with the body of the vehicle 602. For example, the direct connection 612 may allow the transfer of energy, fluids, air, data, etc. between the drive system(s) 614 and the vehicle. In some instances, the direct connection 612 may further releasably secure the drive system(s) 614 to the body of the vehicle 602.

In at least one example, the localization component 620, the perception component 622, the prediction component 626, the relevance component 624, the planner component 628, the one or more system controllers 632, and the one or more maps 630 may process sensor data, as described above, and may send their respective outputs, over the one or more network(s) 634, to the computing device(s) 636. In at least one example, the localization component 620, the perception component 622, the prediction component 626, the relevance component 624, the planner component 628, the one or more system controllers 632, and the one or more maps 630 may send their respective outputs to the remote computing device(s) 636 at a particular frequency, after a lapse of a predetermined period of time, in near real-time, etc.

In some examples, the vehicle 602 may send sensor data to the computing device(s) 636 via the network(s) 634. In some examples, the vehicle 602 may receive sensor data from the computing device(s) 636 and/or remote sensor system(s) via the network(s) 634. The sensor data may include raw sensor data and/or processed sensor data and/or representations of sensor data. In some examples, the sensor data (raw or processed) may be sent and/or received as one or more log files.

The computing device(s) 636 may include processor(s) 638 and a memory 640, which may include a relevance filter analyzer 642. In some examples, the memory 640 may store one or more of components that are similar to the component(s) stored in the memory 618 of the vehicle 602. In such examples, the computing device(s) 636 may be configured to perform one or more of the processes described herein with respect to the vehicle 602. In some examples, the relevance filter analyzer 642 may perform substantially similar functions as the relevance component 624.

The processor(s) 616 of the vehicle 602 and the processor(s) 638 of the computing device(s) 636 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 618 and memory 640 are examples of non-transitory computer-readable media. The memory 618 and memory 640 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 6 is illustrated as a distributed system, in alternative examples, components of the vehicle 602 may be associated with the computing device(s) 636 and/or components of the computing device(s) 636 may be associated with the vehicle 602. That is, the vehicle 602 may perform one or more of the functions associated with the computing device(s) 636, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Figure 7:
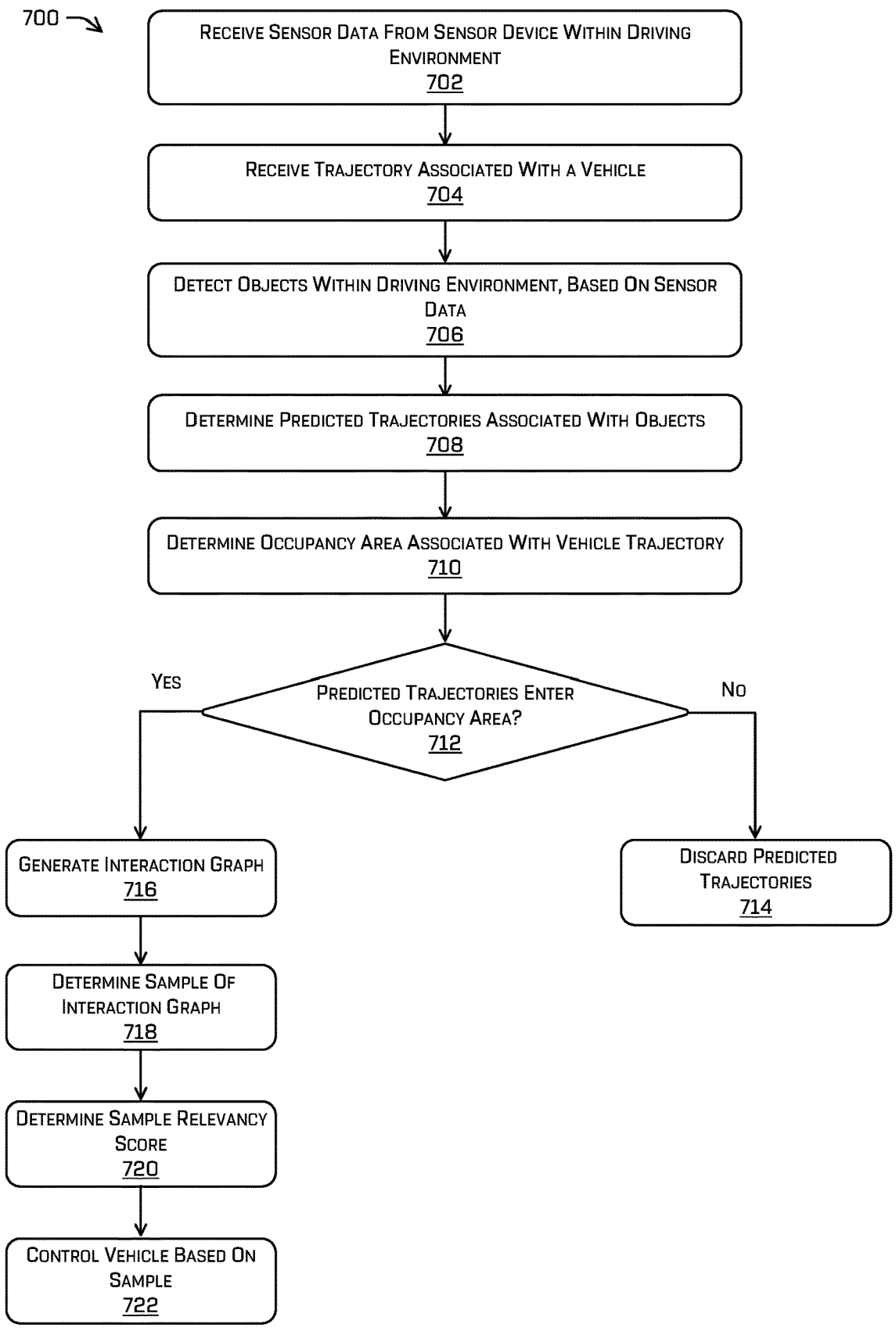
FIG. 7 is a flow diagram illustrating an example process of generating interaction graphs based on predicted trajectories of objects within an environment, generating relevancy scores for the predicted trajectories, and determining relevant driving scenarios based on sampling the interaction graph, in accordance with examples of the disclosure.

FIG. 7 is a flow diagram illustrating an example process 700 of generating interaction graphs based on predicted trajectories of objects within an environment, generating relevance scores for the predicted trajectories, and determining relevant driving scenarios based on sampling the interaction graph. As described below, process 700 may be performed by one or more computer-based components configured to implement various functionalities described herein. For instance, some or all of the operations of process 700 may be performed by a relevance filter 202 configured to generate interaction graphs, determine sample scenarios from the interaction graphs, and generate sample relevance scores. As described above, a relevance filter 202 may be integrated as an on-vehicle system in some examples.

Process 700 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 702, the process can include receiving sensor data from a sensor device within a driving environment. In some examples, the operation 702 may include receiving or capturing sensor data from one or more sensors of an autonomous vehicle as the autonomous vehicle traverses an environment. In some examples, the operation 702 can include receiving sensor data from a sensor remote from the autonomous vehicle (e.g., from another vehicle or a remote sensor).

At operation 704, the process can include receiving a trajectory or path associated with a vehicle. In some examples, the operation 704 may include determining a location of the vehicle in an environment and/or receiving map data associated with the location. In some examples, an occupant may determine a destination location to which the autonomous vehicle may travel. In such examples, a planning component may generate a trajectory that may instruct the autonomous vehicle where and how to traverse within the environment. In other examples, the planning component may generate a path of the autonomous vehicle. As such, the planning component may send the first trajectory (and/or path or location) to the relevance filter.

At operation 706, the process can include detecting objects within the driving environment, based on the sensor data. In some examples, a perception component may use the sensor data to detect and classify objects within the environment. In such examples, the perception component may determine that one or more objects may be proximate to the vehicle. Further, the perception component may classify the type of object.

At operation 708, the process can include determining predicted trajectories associated with the object(s). The perception component may send information regarding the detected object and object classification to the prediction component. In some examples, a prediction component may predict one or more predicted trajectories for the object(s) based on the information received from the perception component. In such examples, the prediction component may also generate a likelihood for each predicted trajectory which indicates how likely a predicted trajectory will be chosen.

At operation 710, the process can include determining an occupancy area associated with the first trajectory. In some examples, the relevance filter may generate an occupancy area based on the vehicle following the first trajectory. In such examples, the occupancy area may be a region within which the vehicle may occupy at a future time. The length of the occupancy area may be determined based on vehicle dynamics (e.g., maximum and minimum acceleration, maximum velocity, current velocity, etc.). The width of the occupancy area may be determined based on a current lane, and/or one or more additional lanes (e.g., a lane to the left of the current lane, a lane to the right of the current lane, etc.).

At operation 712, the process can include determining whether the predicted trajectories enter a portion of the occupancy area. In some examples, the relevancy filter may determine whether the predicted trajectories physically enter the occupancy area. In such examples, the relevance filter may determine whether the object(s) associated with the predicted trajectories that enter the occupancy area also occupy the particular portion of the occupancy area during a same time as the vehicle. If the object(s) physically and temporally overlap with the vehicle within the occupancy area (712:Yes), then the relevance filter may generate an interaction graph 716. For example, at operation 716, the relevance filter may generate an interaction graph representing direct and indirect interactions between the vehicle and the object(s). The interaction graph may include a node for the first trajectory of the vehicle, and a node for each of the predicted trajectories that directly or indirectly interact with the vehicle. At operation 718, the process can include determining a sample of the interaction graph. In some examples, the interaction graph may include various sample driving scenarios. In such examples, the relevance filter may generate a first sample based on the predicted trajectories of each object with the highest likelihood. Further, the relevance filter may generate one or more other samples based on randomly selecting a single predicted trajectory for each object, weighted by the likelihood of the predicted trajectories. At operation 720, the process can include determining a sample relevance score. In some examples, the relevance filter may determine a single relevance score for each sample. The relevance filter may determine a sample relevance score threshold above which the samples may be sent to prediction and planning components. At operation 722, the process can include controlling the vehicle based at least in part on the sample. For example, the prediction and planning components may engage system controllers of the vehicle to execute a trajectory that was generated based on the samples.

In contrast, if the predicted trajectories do not directly or indirectly interact with the first trajectory of the vehicle (712:No), then the relevance filter may discard the predicted trajectories 714. Based on one or more predicted trajectories being discarded, the relevance filter may normalize the likelihoods associated with predicted trajectories for object(s) that did not get discarded.

Example Clauses

A: A system comprising: one or more processors; and one or more non-transitory computer-readable media storing computer-executable instructions that, when executed, cause the one or more processors to perform operations comprising: receiving sensor data associated with an environment; receiving a path for a vehicle to follow through the environment; detecting, based at least in part on the sensor data, an object within the environment; determining, based at least in part on the sensor data, a predicted trajectory associated with the object; determining a likelihood associated with the predicted trajectory; determining, based at least in part on vehicle dynamics associated with the vehicle, an occupancy area associated with the path; determining, based at least in part on the predicted trajectory and the occupancy area, an intersection; generating, based at least in part on the intersection, an interaction graph; determining, based at least in part on the intersection, a relevancy score for a connection of the interaction graph; determining, based at least in part on the likelihood, a sample of the interaction graph; determining a sample relevancy score associated with the sample; and controlling, based at least in part on the sample relevancy score and the sample, the vehicle.

B. The system of paragraph A, wherein generating the interaction graph further comprises: determining a first node associated with the vehicle; determining a second node associated with the object; determining a third node associated with a second object, wherein the second object is associated with an indirect interaction with the vehicle; and determining, based at least in part on the object, a relevance score associated with the second object.

C. The system of paragraph A or B, further comprising: determining, based at least in part on the intersection, a first entry time and a first exit time associated with the predicted trajectory; determining, based at least in part on the intersection and the vehicle dynamics, a second entry time and a second exit time associated with the path; and determining that the first entry time and the first exit time overlap with the second entry time and the second exit time.

D: The system of any of paragraphs A-C, wherein the intersection comprises a characteristic comprising one or more of: a location of spatial overlap; a time period associated with a temporal overlap; or a classification of an object associated with the intersection.

E: The system of any of paragraphs A-D, wherein determining the occupancy area comprises: determining, based at least in part on a current lane, an additional lane, and the vehicle dynamics, a size of the occupancy area.

F. One or more non-transitory computer-readable media storing instructions executable by one or more processors, wherein the instructions, when executed, cause the one or more processors to perform operations comprising: receiving sensor data associated with an environment; receiving a path for a vehicle to follow through the environment; determining, based at least in part on the sensor data, object data representing an object within the environment; determining, based at least in part on the object data, a predicted trajectory associated with the object; determining, based at least in part on vehicle dynamics associated with the vehicle, an occupancy area associated with the path; determining, based on the predicted trajectory and the occupancy area, an intersection; generating, based at least in part on the intersection, an interaction graph; determining a relevancy score for a connection of the interaction graph; and controlling the vehicle based at least in part on the relevancy score.

G. The one or more non-transitory computer-readable media of paragraph F, the operations further comprising: determining a size of the occupancy area based at least in part on a current lane associated with the path, an additional lane, and the vehicle dynamics.

H. The one or more non-transitory computer-readable media of paragraph F or G, the operations further comprising: determining, based at least in part on a predicted likelihood of the predicted trajectory, a sample of the interaction graph; determining a sample relevancy score associated with the sample; and sending, based on the sample relevancy score, a plurality of samples including the sample to a prediction component.

I. The one or more non-transitory computer-readable media of paragraph H, wherein the predicted trajectory is associated with one or more predicted trajectories, the operations further comprising: determining one or more likelihoods associated with the one or more predicted trajectories; and determining that a likelihood associated with the sample is a highest likelihood of the one or more likelihoods.

J. The one or more non-transitory computer-readable media of any of paragraphs F-I, the operations further comprising: determining, based at least in part on the sensor data, that the object is proximate a junction; determining, based at least in part on the sensor data, that the object has a velocity below a threshold; and determining, based at least in part on the object being proximate the junction and the velocity being below the threshold, a second predicted trajectory associated with the object that extends at least partially through the junction.

K. The one or more non-transitory computer-readable media of any of paragraphs F-J, wherein the intersection comprises a characteristic comprising one or more of: a location of spatial overlap; a distance from the vehicle to the intersection; a likelihood of the predicted trajectory; a classification of an object associated with the intersection; a size associated with the intersection; a traffic control signal; or a time period associated with a temporal overlap.

L. The one or more non-transitory computer-readable media of any of paragraphs F-K, the operations further comprising: determining a first node associated with the vehicle; determining a second node associated with the object; determining a third node associated with a second object, wherein the second object is associated with an indirect interaction with the vehicle; and determining, based at least in part on the object, a relevance score associated with the second object.

M. The one or more non-transitory computer-readable media of any of paragraphs F-L, wherein the vehicle dynamics comprises at least one of: minimum acceleration of the vehicle; maximum acceleration of the vehicle; current velocity of the vehicle; or maximum velocity of the vehicle.

N. The one or more non-transitory computer-readable media of any of paragraphs F-M, the operations further comprising: determining, based at least in part on the intersection, an object entry time and an object exit time associated with the predicted trajectory; determining, based at least in part on the intersection and the vehicle dynamics, a vehicle entry time and a vehicle exit time associated with the path; and determining an overlap based at least in part on the object entry time, the object exit time, the vehicle entry time, and the vehicle exit time.

O. A method comprising: receiving sensor data associated with an environment; receiving a path for a vehicle to follow through the environment; determining, based at least in part on the sensor data, object data representing an object within the environment; determining, based at least in part on the object data, a predicted trajectory associated with the object; determining, based at least in part on vehicle dynamics associated with the vehicle, an occupancy area associated with the path; determining, based on the predicted trajectory and the occupancy area, an intersection; generating, based at least in part on the intersection, an interaction graph; determining a relevancy score for a connection of the interaction graph; and controlling the vehicle based at least in part on the relevancy score.

P. The method of paragraph O, further comprising: determining a size of the occupancy area based at least in part on a current lane associated with the path, an additional lane, and the vehicle dynamics.

Q. The method of paragraph O or P, further comprising: determining, based at least in part on a predicted likelihood of the predicted trajectory, a sample of the interaction graph; determining a sample relevancy score associated with the sample; and sending, based on the sample relevancy score, a plurality of samples including the sample to a prediction component.

R. The method of any of paragraphs O-Q, wherein the intersection comprises a characteristic comprising one or more of: a location of spatial overlap; a distance from the vehicle to the intersection; a likelihood of the predicted trajectory; a classification of an object associated with the intersection; a size associated with the intersection; a traffic control signal; or a time period associated with a temporal overlap.

S. The method of any of paragraphs O-R, further comprising: determining a first node associated with the vehicle; determining a second node associated with the object; determining a third node associated with a second object, wherein the second object is associated with an indirect interaction with the vehicle; and determining, based at least in part on the object, a relevance score associated with the second object.

T. The method of any of paragraphs O-S, further comprising: determining, based at least in part on the intersection, an object entry time and an object exit time associated with the predicted trajectory; determining, based at least in part on the intersection and the vehicle dynamics, a vehicle entry time and a vehicle exit time associated with the path; and determining an overlap based at least in part on the object entry time, the object exit time, the vehicle entry time, and the vehicle exit time.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processors; and
   one or more non-transitory computer-readable media storing computer-executable instructions that, when executed, cause the one or more processors to perform operations comprising:
   receiving sensor data associated with an environment;
   receiving a path for a vehicle to follow through the environment;
   detecting, based at least in part on the sensor data, an object within the environment;

determining, based at least in part on the sensor data, a predicted trajectory associated with the object;
determining a likelihood associated with the predicted trajectory being followed by the object;
determining, based at least in part on vehicle dynamics associated with the vehicle, an occupancy area associated with the path;
determining, based at least in part on the predicted trajectory and the occupancy area, an intersection, the intersection representing a position at which the predicted trajectory intersects with the occupancy area;
generating, based at least in part on the intersection, an interaction graph;
determining, based at least in part on the intersection, a relevancy score for a connection of the interaction graph;
determining, based at least in part on the likelihood, a sample of the interaction graph, the sample being associated with a subset of connections of the interaction graph, wherein the subset comprises the connection and a second connection;
determining a sample relevancy score associated with the sample based on the relevancy score and a second relevancy score associated with the second connection;
determining a trajectory associated with the vehicle based at least in part on the sample relevancy score and the sample; and
controlling the vehicle based at least in part on the trajectory.

2. The system of claim 1, wherein generating the interaction graph further comprises:
determining a first node associated with the vehicle;
determining a second node associated with the object;
determining a third node associated with a second object, wherein a second predicted trajectory for the second object intersects with the predicted trajectory before intersecting with the path; and
determining, based at least in part on the second predicted trajectory intersecting with the predicted trajectory, a relevance score associated with the second object.

3. The system of claim 1, the operations further comprising:
determining, a first entry time and a first exit time, the first entry time being associated with entry of the predicted trajectory into a region of the occupancy area, and the first exit time being associated with exit of the predicted trajectory from the region of the occupancy area;
determining, based at least in part on the vehicle dynamics, a second entry time and a second exit time, the second entry time being associated with entry of the path region of the into the region of the occupancy area, and the second exit time being associated with exit of the path from the occupancy area; and
determining that the first entry time and the first exit time overlap with the second entry time and the second exit time.

4. One or more non-transitory computer-readable media storing instructions executable by one or more processors, wherein the instructions, when executed, cause the one or more processors to perform operations comprising:
receiving sensor data associated with an environment;
receiving a path for a vehicle to follow through the environment;
determining, based at least in part on the sensor data, object data representing an object within the environment;
determining, based at least in part on the object data, a predicted trajectory associated with the object;
determining, based at least in part on vehicle dynamics associated with the vehicle, an occupancy area associated with the path;
determining, based on the predicted trajectory and the occupancy area, an intersection, the intersection representing a position at which the predicted trajectory intersects with the occupancy area;
generating, based at least in part on the intersection, an interaction graph;
determining a relevancy score for a connection of the interaction graph;
determining a sample of the interaction graph, the sample being associated with a subset of connections of the interaction graph, wherein the subset comprises the connection and a second connection;
determining a sample relevancy score associated with the sample based on the relevancy score and a second relevancy score associated with the second connection;
determining a trajectory associated with the vehicle based at least in part on the sample relevancy score and the sample; and
controlling the vehicle based at least in part on the trajectory.

5. The one or more non-transitory computer-readable media of claim 4, the operations further comprising:
determining, based at least in part on the sensor data, that the object is at a junction;
determining, based at least in part on the sensor data, that the object has a velocity below a threshold; and
determining, based at least in part on the object being at the junction and the velocity being below the threshold, a second predicted trajectory associated with the object that extends at least partially through the junction.

6. The one or more non-transitory computer-readable media of claim 4, the operations further comprising:
determining a first node associated with the vehicle;
determining a second node associated with the object;
determining a third node associated with a second object, wherein a second predicted trajectory associated with the second object intersects with the predicted trajectory before intersecting with the path; and
determining, based at least in part on the second predicted trajectory intersecting with the predicted trajectory, a relevance score associated with the second object.

7. The one or more non-transitory computer-readable media of claim 4, the operations further comprising:
determining, based at least in part on the intersection, an object entry time and an object exit time, the object entry time being associated with entry of the predicted trajectory into a region of the occupancy area and the object exit time being associated with exit of the predicted trajectory from the region of the occupancy area;
determining, based at least in part on the intersection and the vehicle dynamics, a vehicle entry time and a vehicle exit time, the vehicle entry time being associated with entry of the path into the region of the occupancy area and the vehicle exit time being associated with exit of the path from the region of the occupancy area; and
determining an overlap based at least in part on the object entry time, the object exit time, the vehicle entry time, and the vehicle exit time.

8. A method comprising:

receiving sensor data associated with an environment;

receiving a path for a vehicle to follow through the environment;

determining, based at least in part on the sensor data, object data representing an object within the environment;

determining, based at least in part on the object data, a predicted trajectory associated with the object;

determining, based at least in part on vehicle dynamics associated with the vehicle, an occupancy area associated with the path;

determining, based on the predicted trajectory and the occupancy area, an intersection, the intersection representing a position at which the predicted trajectory intersects with the occupancy area;

generating, based at least in part on the intersection, an interaction graph;

determining a relevancy score for a connection of the interaction graph;

determining a sample of the interaction graph, the sample being associated with a subset of connections of the interaction graph, wherein the subset comprises the connection and a second connection;

determining a sample relevancy score associated with the sample based on the relevancy score and a second relevancy score associated with the second connection;

determining a trajectory associated with the vehicle based at least in part on the sample relevancy score and the sample; and controlling the vehicle based at least in part on the trajectory.

9. The method of claim 8, further comprising:

determining a first node associated with the vehicle;

determining a second node associated with the object;

determining a third node associated with a second object, wherein a second predicted trajectory intersects with the predicted trajectory before intersecting with the path; and determining, based at least in part on the second predicted trajectory intersecting with the predicted trajectory, a relevance score associated with the second object.

10. The method of claim 8, further comprising:

determining, based at least in part on the intersection, an object entry time and an object exit time, the object entry time being associated with entry of the predicted trajectory into a region of the occupancy area and the object exit time being associated with exit of the predicted trajectory from the region of the occupancy area;

determining, based at least in part on the intersection and the vehicle dynamics, a vehicle entry time and a vehicle exit time, the vehicle entry time being associated with entry of the path into the region of the occupancy area and the vehicle exit time being associated with exit of the path from the region of the occupancy area; and determining an overlap based at least in part on the object entry time, the object exit time, the vehicle entry time, and the vehicle exit time.

\* \* \* \* \*